United States Patent [19]
Bergmann

[11] Patent Number: 5,723,522
[45] Date of Patent: Mar. 3, 1998

[54] FIBER-CONTAINING PLASTICS, PROCESS FOR PRODUCING THE SAME, FIBER-CONTAINING GRANULATES, FIBER-CONTAINING POLYMER COMPOUND

[75] Inventor: Franz Bergmann, Köln, Germany

[73] Assignee: Color Plastic Chemie, Albert Schleberger GmbH, Remscheid, Germany

[21] Appl. No.: 619,463
[22] PCT Filed: Sep. 24, 1994
[86] PCT No.: PCT/EP94/03194
§ 371 Date: Mar. 22, 1996
§ 102(e) Date: Mar. 22, 1996
[87] PCT Pub. No.: WO95/08592
PCT Pub. Date: Mar. 30, 1995

[30] Foreign Application Priority Data
Sep. 24, 1993 [DE] Germany .............. 43 32 587.4

[51] Int. Cl.⁶ .............. C08L 1/08; C08L 1/00; C08L 1/24
[52] U.S. Cl. .............. 524/36; 524/35; 523/351
[58] Field of Search .............. 524/36, 35; 523/351

[56] References Cited

U.S. PATENT DOCUMENTS 4,769,405  9/1988  Kondo et al. .............. 524/36

FOREIGN PATENT DOCUMENTS

| 0 259 555 A1 | 3/1988 | European Pat. Off. . |
| 0 596 379 A1 | 5/1994 | European Pat. Off. . |
| 26 58 810 A1 | 7/1978 | Germany . |
| 28 08 576 C2 | 8/1978 | Germany . |
| 63-309529 A | 12/1988 | Japan . |
| 0638603 | 12/1978 | Russian Federation .............. 524/36 |
| 2 040 956 | 9/1980 | United Kingdom . |
| 2 090 849 | 7/1982 | United Kingdom . |

*Primary Examiner*—Peter A. Szekely
*Attorney, Agent, or Firm*—Herbert Dubno; Jonathan Myers

[57] ABSTRACT

The present invention relates to a plastic material which is modified with fiber fillers. Particularly thermoplastic material with melting point above 200 degrees Celsius are selected for this plastic material. As fiber fillers particularly cellulose fibers and/or modified cellulose fibers in practical concentrations of approximately 20% are used.

11 Claims, 1 Drawing Sheet

FIBER-CONTAINING PLASTICS, PROCESS FOR PRODUCING THE SAME, FIBER-CONTAINING GRANULATES, FIBER-CONTAINING POLYMER COMPOUND

FIELD OF THE INVENTION

The invention relates to a fiber-containing plastic material, a process for its production, a fiber-containing granulate, and a fiber containing polymer compound.

BACKGROUND OF THE INVENTION

It has been frequently tried to modify such plastic materials, particularly thermoplastic materials with fibers, in order to achieve a pleasing aspect. The obtained results have always been unsatisfactory, since on the one hand the mechanical impairment of the plastic material could not be avoided. This is due primarily to the fact that the fibers can not be satisfactorily embedded in the plastic matrix, particularly at the fiber ends. The thereby occurring notch effects lead to stress concentrations in the plastic material in the area of the fiber ends, so that as a whole the mechanical strength of the plastic material was reduced.

On the other hand this resulted in a brittleness of the material, so that such modified plastics could not be used.

The above-mentioned drawbacks occur especially when glass fibers, aramid fibers or carbon fibers are used.

The latter have also the additional disadvantage of being sensitive to bending. This partially causes the carbon fibers to break during the extrusion process and to protrude as short stubs from the surface of the plastic material. Such plastic materials can not be used for technical purposes. An overview of these undesired characteristics is offered by Ullman, Encyclopedia of Industrial Chemistry 1992, Vol. A 20, Page 732 and following.

Furthermore it has been tried to incorporate synthetic fibers as fiber fillers into thermoplastic material. However this resulted in premature melting of the synthetic fibers. Thereby on the one hand the fiber structure was damaged. On the other hand another aspect of the fibers suffered, because the crimping effect could not be overlooked. In addition, in the case of synthetic fibers a color mixing of the polymer with the synthetic material can not be completely prevented, so that the required final coloring was always influenced by the color of the plastic material as well as the color of the synthetic fibers.

OBJECT OF THE INVENTION

It is therefore the object of the invention to create a fiber-containing plastic material, which in spite of the embedded fibers, offers good mechanical strength and wherein no interaction occurs between the dyes of the fibers and the dyes of the plastic material.

SUMMARY OF THE INVENTION

The invention solves this problem through a plastic material.

From the invention results the advantage that, due to the clearly good dispersion characteristics of the fibers, a good and even distribution of the fibers in the matrix of the plastic material takes place.

This advantage can be even enhanced in that the fibers as a fiber filler in the form of preliminary extruded granulate can be extruded together with the plastic one more time, without the fibers losing their positive characteristics they have in combination with the plastic material. Due to the double extrusion of the fibers—the preliminary extrusion for producing the granulate and the additional common extrusion with the plastic material—a very good and even distribution of the fibers throughout the plastic material can be achieved. This advantage could not be offered for instance with the use of carbon fibers. With carbon fibers there is always the danger that during extrusion they are filled and mechanically stressed to the extent that they split up and fray.

This advantage is achieved due to the combination of natural or semisynthetic fibers with the corresponding plastic material. Thereby the invention takes advantage of the finding that the fibers are relatively elastic and soft, but at the same time offer a certain mechanical consistency, so that basically they can be completely embedded within the respective plastic matrix. In none of the cases could apparent fibers ends be found on the surface of the plastic material.

It is therefore an aspect of the invention that for these reasons the sought after plastic material can result only from the combination of plastics and fibers.

The fibers can consist of a single material or of a mixture of several fiber types. It could be observed that also mixtures of pure cellulose fibers with modified cellulose fibers have the desired characteristics. Particularly the combination of pure cellulose fibers with the modified cellulose fibers creates further possibilities to take advantage for the invention, in a controlled manner, of the respective positive characteristics of the respective fibers.

In this respect the following has to be mentioned: thermal stability, no influence exerted by the physical polymer characteristics, high resistance to light and/or weathers, and to breakage (e.g. high modulus fibers).

Thereby it could be seen that already mixtures of only two fiber components maintained the above-mentioned advantages and improved the visual aspect of the produced plastic components.

In this connection a particular fiber mixture has to be mentioned, which consists of a fiber mixture of rayon/viscose staple fiber. For the sake of completeness it has to be mentioned that the respective component proportions of the rayon as well as of viscose staple fiber can range between 100 and 0%, without limiting the invention.

Here too a further advantage of the invention results: namely according to the invention, as a rule all possible cellulose fibers can be mixed with each other in any desired concentrations.

Thereby the individual fiber components can be used as such or the fiber components can be dyed before or after the staple fiber formation.

Very good results have been obtained with fibers dyed by spinning nozzles. This can be explained by the fact that in fibers dyed by spinning nozzles there is no direct contact between the color pigment and the plastic. It is assumed that because of this a coloring of the plastic material by the color pigments of the fibers does not take place.

The advantage of the wide variation range of fiber concentrations is actually based on the fact that the concentration of the cellulose fibers in the plastic matrix is limited to a certain percentage. Thereby 20% is the limit value at which a sufficient fiber incorporation can still be noticed. In the case of rayon/viscose staple fibers the proportion of fibers by volume was equal to the proportion of the plastic material.

As long as the above limit value is observed, the characteristics of the modified plastic is as a rule independent of the respective proportions of fiber components in fiber mixtures.

Thereby the invention deserves particular attention, because the matrix of plastic material is made of a plastic whose color is in contrast with the color of the fibers.

In such plastics especially the fibers embedded within the matrix of plastic materials can be easily recognized from the outside, whereby a certain depth effect is created. Further it was found that plastic materials modified with fibers of such length have a basic tendency to be less sensitive to dirt.

Thereby the depth effect could be improved especially with embossed surfaces, since the embossing diminished the light reflection. As a result even the fibers which were deeper embedded in the plastic became visible.

In spite of that, the plastic material had a continuous plastic surface, without protruding fiber ends and with a touch similar to leather imitations.

There are known applications, especially applications in the automobile industry, whereby up to now the plastic material was lacquered in order to improve its appearance. In view of increasing requirements of recycling capability, such plastic materials can barely remain marketable in the future. Therein resides an essential advantage of the invention.

The plastic of the invention can be recycled almost as often as desired, due to its fiber characteristics which can not be influenced. It has particularly been noticed that even after repeated processing the fibers did not influence the color of the plastic matrix. This way a plastic was created whose textile character, respectively its decorative properties, could be preserved even after repeated recycling processes.

The fiber diameters of 1 to 500 microns have been proven to be advantageous, whereby especially in mixtures of several fiber types, the fiber diameters do not have to be identical.

The modified plastic of the invention has proven itself especially suitable for use in the construction of vehicles, for their interior as well as their exterior.

Preferred plastic matrices include polymers and particularly e.g. polyolefins, acrylonitrile-butadiene-styrene in combination with polycarbonate or polyamide, respectively polyvinylchloride in combination with acrylonitrile-butadiene-styrene namely as blends or mixtures of polymer.

Polypropylene is also of great importance, a fact which has to be noted.

The above-mentioned polymers can be used in combination with organic and/or inorganic pigments and/or dyes.

Particularly the coloring additives can come in any kind of preparation, including granulates, paste, grit or powder.

Particularly the preparation known as so-called "master batch" and/or the preparation known as so-called "polymer compound" has to be mentioned within the framework of the invention. Thereby one starts from the assumption that a master batch is a highly enriched mixture of additives, which are supplied in a proportion of 1–2%. The special advantage of this preparation resides in the fact that with small amounts of additives an easy dosage with homogeneous processing can take place.

Further polymer compounds are considered preferred preparations. Within the framework of the present invention, the starting point in the case of polymer compounds is a process-ready mixture of polymers and synthetic materials with other additives, as far as these are necessary for obtaining the final product.

Preferred polymers for forming the matrix include low pressure polyethylenes, high pressure polyethylenes, polypropylenes, polymethylmethacrylates, polyvinylchlorides, polyvinylidene chlorides, polytetrafluoroethylenes, polyamides, aromatic polyesters, polycarbonates, polysulfones, polystyrenes, polyacetals, thermoplastic polymers of styrene and butadiene, acrylonitrile-butadiene-styrenes, polyurethane resins, synthetic rubbers, ethylene-propylene elastomers, polypropylene/ethylene-propylene-diene terpolymers, elastomeric copolymers of styrene and butadiene, elastomeric copolymers of styrene and chloroprene and polyurethane foams.

Such combinations can include all the usual additives, depending on use. Light protection agents, such as for instance UV-absorbers, are given special consideration and so are antistatic agents and thermal stabilizers.

An essential aspect in the construction of motor vehicles is the possibility to incorporate flame retardent agents.

For certain technical purposes, lubricating agents can also be used.

Talcum or chalk can be processed in as fillers, without causing the modified plastic material to lose the above-mentioned properties.

Furthermore it has to be specifically pointed out that, by applying the invention, not only thermoplastic materials can be modified, but heat-hardenable plastics, foam materials and elastomer plastics can be modified just as well.

Further the injection molding process is to be selected as a processing method, also rotomolding, as well as extrusion into flat foils, plates, tubes or other profiles.

It has been proven that repeated extrusion does not impair the fiber filling material of the invention.

Furthermore the fiber filling of the invention can be used in the bottle blowing process or in the injection blowing process, as well as in the molding of e.g. unsaturated polyester resins, respectively polyurethane-resins, phenol resins, aminoplastics, monomers polymethylmethacrylate.

Thereby the production of the modified plastics material according to the invention can be achieved with simple means in all the usual installations for the processing of plastics, in that e.g. a polymer is combined with the fiber-containing plastic granulate and extruded into the corresponding workpiece, formed component, semifinished product.

Thereby the granulate is added to the polymer in a proportion of for instance approximately 0.5 to 20%. According to the invention the granulate contains the additives and the natural or semisynthetic fibers, e.g. spinnable cellulosic fiber.

The respective granulate proportion depends thereby on the desired filling ratio and the desired fiber content, which can be predetermined by the selected visual effect. Furthermore the granulate content is determined by the respective color intensity of the semifinished product, the formed component or the workpiece.

The preferred length of the granulate ranges between 1 mm and 4 mm, and the diameter between 1 mm and 3 mm.

The essential advantage of the invention resides in the fact that the basic color shade of the plastic matrix is not influenced by the cellulose fibers and/or modified cellulose fibers, as well as in that due to the thermal stability of the cellulose fibers and/or the modified cellulose fibers, plastic materials with processing temperatures of at least 280 degrees Celsius can be processed.

In principle within the framework of the present invention no upper limits for processing temperatures should be indicated. This is due to the fact that processing temperatures can get locally very high, particularly in extruders, while the melting temperatures of the plastic are much lower. The temperatures limit in question will therefore guide itself according to the heat transmission laws within the range of the highest processing temperatures. However it can be basically stated that a certain interval between the processing temperatures and the carbonization temperature of the fiber should be established.

BRIEF DESCRIPTION OF THE DRAWING

The above and other objects, features, and advantages will become more readily apparent from the following description, reference being made to the accompanying drawing in which.

EMBODIMENT EXAMPLE:

For the embodiment examples shown in FIGS. 1–2, at first a master batch was prepared as follows:

The master batch contained 20 parts by weight of pigment and 15 parts by weight of fiber fillers, i.e. rayon/viscose staple fibers, which are spun dyed staple fibers, dyed black, having a fiber length of 0.8–1 millimeter and thickness of 17 g/1000 m. By further adding 65% parts by weight polypropylene, these components were homogenized in a double worm extruder and dispersed. Subsequently processing to a granulate with a grain size of 2 mm in diameter and 3 mm in length took place.

From this master batch 4% parts by weight to 100% unmodified polypropylene are fed in the injection molding process together with unmodified propylene to a common extruder and extruded to a 4 mm plate.

Figure 1:
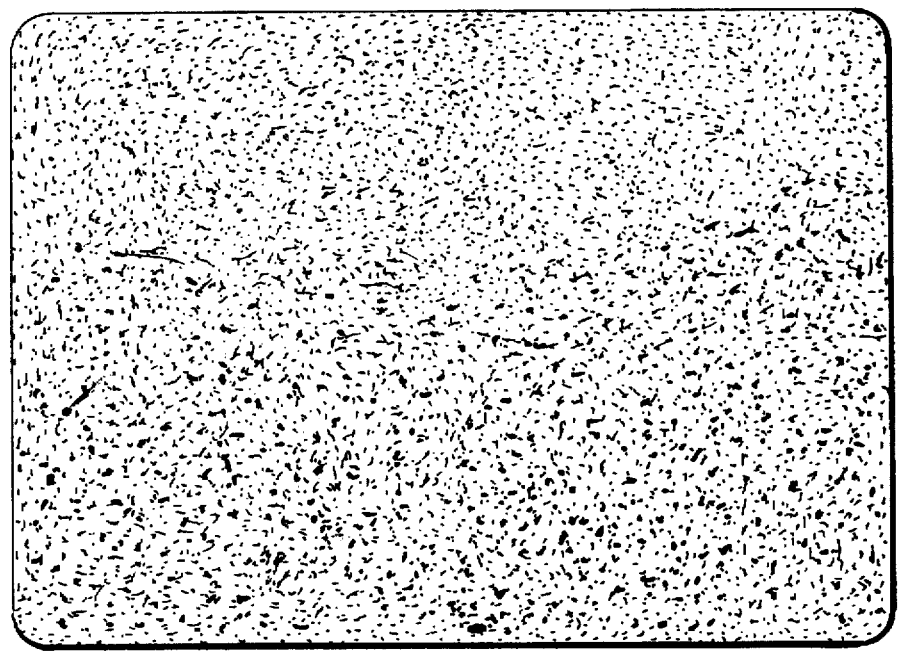
FIG. 1 is a test plate of a plastic material having a polypropylene matrix and rayon/viscose fibers.

As shown in this connection in FIG. 1, the fiber filler is evenly distributed over the entire surface of the test plate. Visible are not only the rayon/viscose staple fibers which are located at the plate surface, but it can also not be overlooked that a certain depth effect exists.

Figure 2:
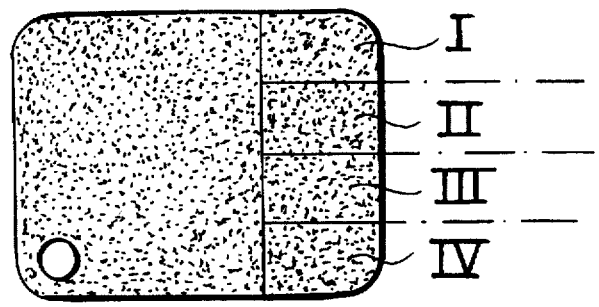
FIG. 2 is a set of test plates of the same plastic material as in FIG. 1 except in FIG. 2, steps I, II, III and IV are shown on the right side.

In this connection FIG. 2 shows further test plates. In the area to the right, in these test plates four steps I–IV have been cut, so that the dispersion in the direction of the plate thickness can be seen. The four steps I–IV are at a distance from the visible plate surface of 1 millimeter, 1.5 millimeter, 2 millimeter and 2.5 millimeter. The total thickness of the plate is 5 mm. Consequently the cutting plane of step I corresponds to a section through the plastic plate at a distance of 1 millimeter from the plate surface, the cutting plane of step II to a section through the plastic plate at a distance of 1.5 millimeters from the plate surface, and so forth.

In principle no difference in the distribution of the rayon/viscose staple fibers in the finished product could be established depending on the respective distance from the surface of the plastic plate. This has been confirmed by multiple testing.

Therefore the invention relates in its preferred embodiment to a fiber-containing plastic, which has 0.01 to 20 parts by weight to 100 parts by weight of the plastic material, at least one natural or semisynthetic fiber, except a microbially produced cellulose fiber, whereby the natural fiber is a vegetal fiber selected from cotton, jute or flax, or an animal fiber of wool, and the semisynthetic fiber is a spinnable cellulosic fiber, and whereby as a result the plastic material has a depth effect and the color of the plastic matrix is in contrast with the color of the fibers.

I claim:

1. A fiber-containing plastic material which comprises:
   (a) 0.01 to 20 parts by weight of a spun dyed cellulose fiber, wherein the spun dyed cellulose fiber is a viscose fiber, said 0.01 to 20 parts by weight of the spun dyed cellulose fiber present per 100 parts by weight of the plastic material; and
   (b) a plastic matrix comprising at least one polymer in which the spun dyed cellulose fiber is contained, wherein the plastic material presents a depth effect, that the color of the plastic matrix is in contrast with the color of the fibers.

2. The fiber-containing plastic material defined in claim 1 in the form of an article having an embossed surface for improving the depth effect.

3. The fiber-containing plastic material defined in claim 1 wherein the spun dyed viscose fibers are staple fibers with a fiber length of 50 microns to 5 mm and have a diameter of 1 micron to 500 microns.

4. The fiber-containing plastic material defined in claim 1 wherein the spun dyed viscose fibers resemble wool fibers or cotton fibers.

5. The fiber-containing plastic material defined in claim 1 wherein the plastic matrix comprises at least one polymer selected from the group consisting of low pressure polyethylenes, high pressure polyethylenes, polypropylenes, polymethylmethacrylates, polyvinylchlorides, polyvinylidene chlorides, polytetrafluoroethylenes, polyamides, aromatic polyesters, polycarbonates, polysulfones, polystyrenes, polyacetals, thermoplastic polymers of styrene and butadiene, acrylonitrile-butadiene-styrenes, polyurethane resins, synthetic rubbers, ethylene-propylene elastomers, polypropylene/ethylene-propylene-diene terpolymers, elastomeric copolymers of styrene and butadiene, elastomeric copolymers of styrene and chloroprene and polyurethane foams.

6. The fiber-containing plastic material defined in claim 5 wherein the plastic matrix comprises a blend or mixture of polymers.

7. The fiber-containing plastic material defined in claim 1 which further comprises at least one auxiliary agent selected from the group consisting of dyes, pigments, filling materials and additives.

8. A master batch containing 0.01 to 80.00 parts by weight of at least one spun dyed cellulose fiber which is a viscose fiber relative to 100 parts by weight of the master batch and a plastic matrix comprising a polymer selected from the group consisting of low pressure polyethylenes, high pressure polyethylenes, polypropylenes, polymethylmethacrylates, polyvinylchlorides, polyvinylidene chlorides, polytetrafluoroethylenes, polyamides, aromatic polyesters, polycarbonates, polysulfones, polystyrenes, polyacetals, thermoplastic polymers of styrene and butadiene, acrylonitrile-butadiene-styrenes, polyurethane resins, synthetic rubbers, ethylene-propylene elastomers, polypropylene/ethylene-propylenediene terpolymers, elastomeric copolymers of styrene and butadiene, elastomeric copolymers of styrene and chloroprene and polyurethane foams.

9. The master batch defined in claim 8, when said master batch is in a granulated form.

10. A process for producing a fiber-containing plastic material which comprises:
   (a) 0.01 to 20 parts by weight of a spun dyed cellulose fiber, wherein the spun dyed cellulose fiber is a viscose fiber, said 0.01 to 20 parts by weight of the spun dyed cellulose fiber present per 100 parts by weight of the plastic material; and (b) a plastic matrix comprising at least one polymer in which the spun dyed cellulose fibers are contained, wherein the plastic material presents a depth effect, that the color of the plastic matrix is in contrast with the color of the spun dyed cellulose fibers, which comprises the steps of:

homogenizing the spun dyed cellulose fibers and the polymer forming the plastic matrix; and dispersing the fibers through the plastic matrix with simultaneous thorough mixing.

11. The process for producing a fiber-containing plastic material defined in claim 9 wherein the spun dyed cellulose fibers and the polymer used are in the form of a granulate, with 0.01 to 80.00 parts by weight cellulose fiber relative to 100 parts by weight of the fiber-containing plastic material.

* * * * *